March 10, 1931. E. DAVIS Re. 17,990
GARMENT OR IRONING PRESS
Original Filed April 9, 1926
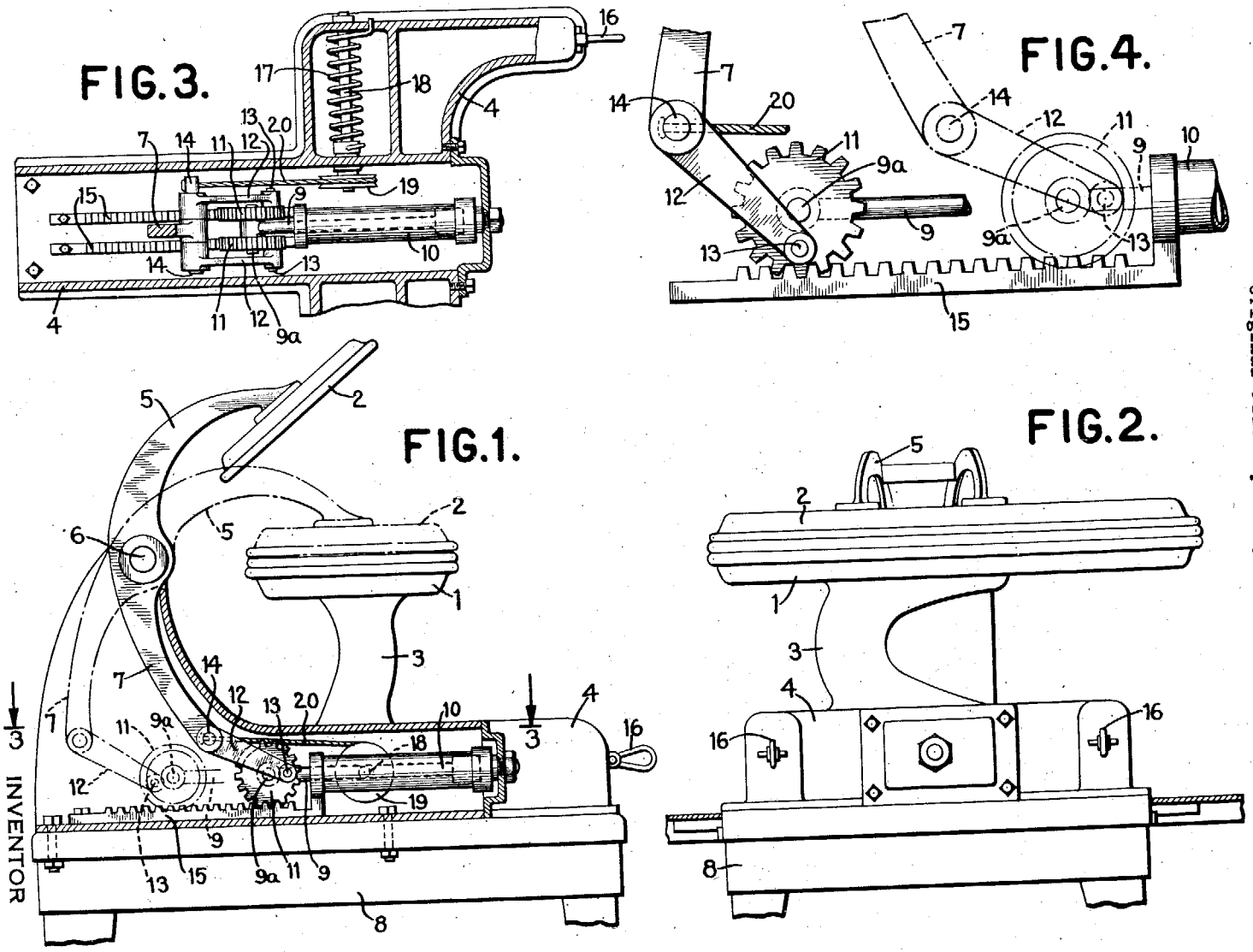
INVENTOR
ERNEST DAVIS
BY HIS ATTORNEYS
Bohleber + Ledbetter.

Reissued Mar. 10, 1931

Re. 17,990

UNITED STATES PATENT OFFICE

ERNEST DAVIS, OF SYRACUSE, NEW YORK, ASSIGNOR TO THE PROSPERITY COMPANY, INC., OF SYRACUSE, NEW YORK, A CORPORATION OF NEW YORK

GARMENT OR IRONING PRESS

Original No. 1,691,646, dated November 13, 1928, Serial No. 100,985, filed April 9, 1926. Application for reissue filed November 24, 1930. Serial No. 497,740.

This invention relates to pressing machines and has for its object a particularly simple, compact and efficient actuating mechanism for the movable element or press head of the machine whereby a powerful actuating mechanism can be located within a comparatively small space or within the base of the pressing machine.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of a pressing machine embodying my invention.

Figure 2 is a front elevation of parts seen in Figure 1.

Figure 3 is an enlarged fragmentary sectional view showing the actuating mechanism in plan view.

Figure 4 is an enlarged fragmentary diagrammatical side elevation of a portion of the actuating mechanism.

This mechanism comprises, generally, a reciprocating prime mover, a driven element and connections between the prime mover and the driven element whereby the motion of the prime mover is first increased to effect a fast and comparatively great movement of the driven element and is thereafter reduced to effect a powerful but short movement of the driven element upon a long movement of the prime mover.

The actuating mechanism is here shown as embodied in a pressing machine of the type used for pressing clothes and laundry, and the pressing machine here shown in which my invention is embodied comprises pressing jaws such as a buck 1 and a head 2 movable toward and from the buck, the buck being mounted upon a bracket or goose neck 3 which in turn is mounted upon a base 4 and the head being carried by the forward arm of a yoke or lever 5 pivoted between its ends at 6 to an upright rising from the frame and having its other arm 7 extending into the frame and connected to the actuating mechanism. This lever constitutes the driven element.

The base 4 is formed hollow and the actuating mechanism is located therein and also the base 4 is mountable upon a table or bench 8. The base and the construction of the pressing machine, per se, forms no part of this invention but forms the subject matter of another application, the subject matter of this application being the actuating mechanism for the lever 5 or arm 7.

The prime mover is a reciprocating element as a piston rod 9 connected to a piston movable in a cylinder 10, the cylinder 10 and the rod 9 being here shown as arranged in horizontal position and extending forwardly and rearwardly in the hollow base 4. The connections between the rod 9 and the driven element or lever 5, which connections first increase the motion of the rod 9 and then reduce it, comprises a rotatable member here shown as a gear 11 mounted on a suitable transverse stud or bearing pin $9^a$ at the outer end of the piston rod 9 and a link 12 mounted at one end on an eccentric or crank pin 13 on the gear 11 and pivoted at its other end at 14 to the lower end of the lever 5. Thus, the gear moves reciprocally with the rod 9. Means is provided for rolling the gear as a rack 15 meshing with the gear. As here shown, there are two gears mounted on opposite sides of the piston rod and each mesh with the rack 15.

In operation, as best seen in Figure 4, the initial movement of the arm 7 of the lever 5 is greater than the movement of the piston rod during its initial movement, by the fact that the eccentric or crank pin 13 is carried during the rolling of the gear forwardly in the same direction as the rod is moving, so that the lever 5 partakes of the movement of the rod 9 plus the rolling movement of the gear means 11 and the head 2 is brought down toward the buck 1 quickly. When the head 2 is brought down on the buck, the gear 11 has made substantially a half revolution as seen in Figure 1 and during the remainder of the power stroke of the piston which is comparatively long, the eccentric pin 13 moves rearwardly so that the net movement of the lever 5 is the difference between the movement of the rod 9 and the movement of the pin 13. Hence, the motion of the piston rod during the latter part of the power stroke is transferred through a reduction leverage so that a comparatively long movement of the piston is converted into a powerful short movement of the press head.

The cylinder is preferably a single acting cylinder and the flow of air or other motive fluid thereof is controlled in any suitable manner as by handles designated 16, there being two handles both of which must be operated during the closing of the press in order to keep both hands out of danger of being caught in the press. The control of the motive fluid to the cylinder forms no part of this invention and is unnecessary to an understanding thereof.

The press is opened and the parts restored to their starting positions by a counterbalance spring 17 suitably connected to a shaft 18 to turn the same, the shaft having a winding drum 19 thereon which is connected by a cable 20 to the lower arm of the lever 5. During the closing of the press by power, obviously, the spring will be tensioned and when the power is released in the cylinder 10, the spring will react and open the press.

From the foregoing it will be seen that I provide operating means including a motor 10 with a spring and wind up return means 17—20 connected to the press head 2 for opening and closing the press, together with a characteristic operating connection or link means of compact and short form which is adapted to vary its effective length during the operation of the motor means. The result is that, although the motor piston rod 9 is adapted to traverse the distance of its stroke at a substantially uniform expenditure of power, the speed at which the press head is operated varies with respect thereto. This motor means 10 and its variable leverage means 11—12 therefore possesses the advantage of a high-speed drive for the press head 2 during the closing of the press, whereupon a low-speed drive automatically comes into play to afford a higher leverage of the motor over the press head.

The variation in speed ratio between the movement of the piston rod 9 and the press head 2 is clearly shown in Figure 1 wherein the gears 11 make approximately a half revolution while the piston rod pin $9^a$ traverses approximately two-thirds of its forward or power stroke, and the travel of lever means 5 and press head 2 is equal to the travel of the piston rod plus the horizontal forward travel of the crank pin 13 of the operating connections. Moreover, while the piston rod 9 is continuing its forward or outward stroke and traversing the remainder or final one-third of its stroke, the gears 11 continue to rotate outwardly for approximately one-fourth of a revolution, but now the horizontal movement of the crank pin 13 is a receding or backward movement with respect to the travel of the piston rod 9 with the result that the net movement which is now imparted to the lever means 5 is approximately equal to the forward travel of the piston rod minus the backward movement of the crank pin 13, and the press head is therefore forced thru a short distance against the press buck 1 by a long powerful out or forward power stroke of the motor means 10 as hereinbefore described.

It is clear therefore that a long piston out stroke is translated into a short press head squeezing movement by reason of the starting of the reverse or subtracting movement of the crank pin 13 at the time the head 2 reaches the press buck 1. The result is that the mechanical advantage or leverage of the motor means is considerably greater during final jaw compression than when the motor means is swinging the press head toward the buck.

The press operating mechanism here shown is particularly adapted to be mounted in a small chamber or housing space wholly within the base of a small size pressing machine. This operating means for driving a press lever means back and forth is small and compact with relatively short parts and is especially well adapted to small size presses and bench-type presses. The latter type of press has a flat face or smooth bottom frame means adapted to rest on a bench or table of standard height above the floor with the press buck 1 close to the frame base 4. Such frame means necessarily does not afford any too much room in which to easily lay out and assemble long lever means or a long-travel toggle. This novel and compact short length motion transmitting mechanism combines well with the type of frame shown and is unique in its organization in and with the small and rather crowded press frame or hollow base 4.

Although the somewhat crowded or limited space frame 4 is found to constitute a marked advantage in numerous uses and plant requirements, its adoption presented a problem as to a simple and correspondingly small size motor means capable of high initial velocity coupled with ample subsequent power to exert great jaw compression. That problem is solved with this motor means because its component parts may be made small and light weight, the distances between pivotal and bearing centers are shorter, and the operation of the machine is not unduly hampered by momentum and inertia. Hence the problem of stopping and starting the machine is an easier one due to less mass traveling over shorter distances.

What is claimed is:

1. An actuating mechanism comprising a reciprocating prime mover, an oscillating driven element, connections between the prime mover and the driven element comprising a gear mounted on the reciprocating prime mover and having a rocking movement, an eccentric pin on the gear arranged when in starting position between the axis of the gear and the prime mover and movable through more than one half of a revolution and approximately three quarters of a revolution during the rocking of the gear and the movement of the prime mover in one direction, means for rocking the gear comprising a stationary rack with which the pinion meshes, and a link connecting the eccentric pin and the oscillating driven element.

2. A pressing machine comprising a base, a buck mounted on the base, a head movable toward and from the buck, a lever carrying the head, the lever being pivoted to the base in the rear of the buck, means for actuating the lever comprising a cylinder arranged in horizontal position in the base beneath the buck, a piston movable in the cylinder and having a reciprocally movable rod, the lever supporting the head having a downwardly extending arm, and motion transmitting mechanism between the rod and said arm including an element movable with the rod and also relatively thereto during the movement of the rod, and means connecting said element and the lever arm to transmit the combined movement of said element with the rod plus the relative movement of said element to the lever arm.

3. A pressing machine comprising a hollow base, a buck mounted on the base, a head movable toward and from the base, a lever carrying the head pivoted intermediate of its ends to the base and having an arm extending into the base, actuating means for said lever located in the base including a reciprocating prime mover and connections between the prime mover and said arm comprising a rotatable member movable with the prime mover during the reciprocating movement thereof, a link pivoted at one end eccentrically to the rotatable member and at its other end to said arm, and means for rolling said member during the reciprocating movement thereof.

4. A garment or ironing press comprising a frame including a hollow base adapted to rest upon a table surface of standard height, a buck mounted upon said base, a movable press head above the buck, lever means secured to the press head, means for producing a reciprocating motion located wholly inside the hollow base under the buck and above the table surface, operating connections located above the table surface to connect the motion producing means with the lever means, said operating connections comprising combination rotary and reciprocatory means adapted to move the press head faster during its initial movement from open to closed-press position than during the latter portion of said movement.

5. A garment or ironing press comprising a frame including a hollow base adapted to rest upon a table surface, a support bracket rising from the base, a press buck mounted upon said bracket, a movable press head above the buck, lever means having one end secured to the press head and the other end directed downwardly into the base, a piston and cylinder mounted in the hollow base in parallel proximity to and above the table surface but below the support bracket, short operating connections arranged between the piston and the lever means to close the press, and means to open the press including a pulling member having one end thereof anchored to the downwardly directed end of the lever means, said pulling member being mounted substantially parallel to the cylinder and within the hollow base, and means associated with the other end of the pulling member to exert a pull on the lever means.

6. A garment or ironing press adapted to rest upon a bench or table and comprising a hollow base, a buck mounted on the base, a press head movable toward and from the buck, lever means having one end attached to the press head the other end curved downwardly into the base, motor means mounted in said base, operating connections between the lever means and the motor means to close the press, and means to open the press including a pulling member disposed adjacent the motor means and arranged parallel and above the table surface and connected at one end thereof to the curved end of the lever means, the other end of the pulling member being directed toward the front of the press, and spring means cooperating with the last named end of the pulling member to exert a press-opening force on the lever means.

7. A garment or ironing press comprising a frame, a buck supported on the frame, a press head movable toward and from the buck, lever means on one end of which the press head is carried, motor means mounted in the frame, an operating connection between the motor means and the lever means to close the press; and means to open the press comprising a shaft journalled in the frame, a helical spring around the shaft and having one end thereof secured to the shaft to rotate therewith and the other spring end anchored to the base in a stationary manner, a drum secured to the shaft, a flexible pull connection having one end wound about and secured to the drum and the other end secured to said lever means, whereby the movement of the motor means to close the press draws outwardly on the flexible pull connection which rotates the drum and shaft to tension the spring for opening the press.

8. A garment or ironing press adapted to rest upon a table surface, a pair of coacting press jaws including a press head and buck mounted upon a frame, said frame including a hollow base under the jaws, lever means for opening and closing the press jaws, one end of the lever means being secured to the head and swingably disposed above the buck and the other end thereof extending below and behind the jaws, said lever means comprising a curved member with its rear end swingably disposed within the hollow base and adapted to be directed forwardly toward the front of the press, and operating means mounted wholly within the hollow base under the buck in horizontal alignment with the table surface and close to the lower forwardly directed end of the lever means, and short link means connected between the lever means and the operating means to enable said operating means to actuate the press head.

9. A garment or ironing press adapted to rest upon a table or bench means as a support, and having a pair of flat horizontally disposed coacting press jaws mounted upon a frame, said jaws comprising a stationary buck and a movable head, and said frame including a hollow base, lever means secured to the head for opening and closing the press jaws by moving the head to and from the buck; and a fluid-pressure motor mounted within the base of the frame and under the press jaws and including a cylinder, a piston and a connecting rod disposed in a horizontal position above the table support but under the press jaws and within the hollow base and adapted to traverse the distance of its stroke at a substantially uniform rate of expenditure of motive energy; in combination with variable speed short link means connected between the lever means and the connecting rod, whereby said rod is adapted to move the head rapidly during the initial portion of its movement toward the buck and during the remainder of said movement to move the head slowly until it presses upon said buck.

10. A garment or ironing press having a frame, comprising a hollow flat-bottomed base adapted to rest upon a table surface, a support on the hollow base, a buck on the support, and a press head above the buck, in combination with operating means to actuate the press head to and from the buck, said operating means including a motor mounted wholly within the base under the support and in proximity to the table surface, a lever pivotally mounted on the frame intermediate its ends and having one end secured to the press head and the other end projecting downwardly into said hollow base, and short length means mounted within the hollow base and operatively connecting the lever to said motor and through which the motor actuates the press head to and from the buck.

11. A garment or ironing press comprising a hollow base having a flat bottom face, coacting press jaws disposed above the base, operating means to open and close the press including motor means located wholly within the base above the bottom of the hollow base, lever means attached at one end thereof to one press jaw, the other end of the lever means curving rearwardly from the press jaws and reaching downwardly below the jaws and terminating within the hollow base in proximity to the plane in which the motor means is located, in combination with a short-length operating connection between the motor means and the lever means, said operating connections being adapted to move the press head faster than the motor means during the initial part of the press head movement from open to closed-press position and slower than the motor means during the latter portion of said movement.

12. A garment or ironing press adapted to rest upon a table and having coacting press jaws, a frame, said frame including a hollow base, lever means attached to one jaw for opening and closing the press, and a motor means including a cylinder disposed in a horizontal position within the base of the frame and under the press jaws, a piston rod adapted to traverse the horizontal distance of its stroke under a substantially uniform expenditure of motive force, in combination with an operating connection between the piston rod and lever means, said operating connection comprising a gear rack mounted in the base, gear means rotatably mounted on the piston rod in engagement with and adapted to be rotated by the gear rack as said piston rod is moved back and forth by the motor, a crank pin carried eccentrically on the gear means and having an effective horizontal movement with respect to the piston rod; and a link connected between said crank pin and lever means, whereby the movement transmitted to said lever means during a part of the power stroke of the piston rod is substantially equal to the forward horizontal movement of the piston rod plus the forward horizontal movement of the crank pin which moves the press jaw quickly toward closed position, and the movement transmitted to said lever means during the remaining part of the power stroke of the piston rod is substantially equal to the forward horizontal movement of the piston rod minus the backward horizontal movement of the crank pin which forces the press jaw slowly onto the work to produce jaw compression.

13. A garment or ironing press comprising a hollow base having a flat horizontal bottom adapted to rest upon a table of standard height, said base including a shallow horizontal chamber, a hollow upright rising from the rear portion of said chamber, and a cover closely spaced above and substantially parallel to the flat horizontal bottom and disposed above the chamber and having an upwardly extending curved rear portion closing the front of the hollow upright; a support mounted upon the base and carrying a buck; a movable press head above the buck; lever means operatively carried by the upright, with a forwardly extended lever portion attached to the head, and with a downwardly extended rear end curved into the hollow upright behind the cover and adapted to occupy a position close to the upwardly extended cover; motor means mounted wholly within the shallow horizontal chamber above the table for actuating the lever means, said motor means including cylinder and piston rod means disposed under the buck and having an operative connection between the lower end of the lever means and the motor means for swinging the press head toward the buck; and spring means within the hollow base to open the press.

14. A garment or ironing press comprising a hollow base having a flat horizontal bottom adapted to rest upon a table of standard height, said base including a shallow horizontal chamber, a hollow upright rising from the rear portion of said chamber, and a cover closely spaced above and substantially parallel to the flat horizontal bottom and disposed above the chamber and having an upwardly extending curved rear portion closing the front of the hollow upright; a support mounted upon the base and carrying a buck; a movable press head above the buck; lever means operatively carried by the upright, with a forwardly extended lever portion attached to the head, and with a downwardly extended rear end curved into the hollow upright behind the cover and adapted to occupy a position close to the upwardly extended cover; motor means mounted wholly within the shallow horizontal chamber above the table for actuating the lever means, said motor means including cylinder and piston rod means disposed under the buck and having an operative connection between the lower end of the lever means and the motor means for swinging the press head toward the buck, said operative connection embodying means for increasing the force of the mechanism after the press head reaches the buck; and spring means within the hollow base to open the press.

In testimony whereof I affix my signature.

ERNEST DAVIS.